United States Patent [19]

Firth

[11] 4,353,558

[45] Oct. 12, 1982

[54] HYDROSTATIC RETORT SEAL

[75] Inventor: Donald Firth, Los Angeles, Calif.

[73] Assignee: Tosco Corporation, Los Angeles, Calif.

[21] Appl. No.: 203,972

[22] Filed: Nov. 4, 1980

[51] Int. Cl.³ .............................................. F16J 15/40
[52] U.S. Cl. .................................. 277/30; 277/72 R; 277/74; 277/135
[58] Field of Search ...................... 277/135, 13, 14, 15, 277/17, 30, 71, 74

[56] References Cited

U.S. PATENT DOCUMENTS

| | | | |
|---|---|---|---|
| 1,748,178 | 2/1930 | Hume | 277/13 |
| 1,994,858 | 3/1935 | Lack et al. | 286/7 |
| 2,262,687 | 11/1941 | Little | 286/9 |
| 2,300,385 | 10/1942 | Kollberg et al. | 277/72 |
| 2,407,285 | 9/1946 | King | 277/14 |
| 2,431,446 | 11/1947 | Anderson | 254/192 |
| 2,738,208 | 3/1956 | Mylander | 286/9 |
| 2,903,970 | 9/1959 | Elovitz et al. | 277/14 |
| 3,081,975 | 3/1963 | Sproule | 277/72 |
| 3,289,791 | 12/1966 | Ulinski | 277/30 |
| 3,502,342 | 3/1970 | Albert | 277/17 |
| 3,572,727 | 3/1971 | Greiner | 277/74 |
| 3,767,213 | 10/1973 | Cyphelly | 277/30 |
| 3,851,741 | 12/1974 | Sugahara et al. | 277/73 |
| 4,146,238 | 3/1979 | Gaffal | 277/15 |
| 4,193,756 | 3/1980 | Leon | 432/3 |

FOREIGN PATENT DOCUMENTS 173588 12/1960 Sweden ......................... 277/30

Primary Examiner—Robert I. Smith
Attorney, Agent, or Firm—Poms, Smith, Lande & Rose

[57] ABSTRACT

A hydrostatic retort seal for sealing to a seal disc on the rotating vessel portion of a rotating retort. An annular caliper assembly is mounted concentrically around the seal disc. The annular caliper assembly includes a body portion having two arms. Each arm on its interior surface includes an annular sealing channel which is filled with liquid under pressure to provide a liquid interface seal layer between the caliper assembly arms and the seal disc. The sealing channels are movable laterally relative each other and are biased inward so that the distance between the two channels or seal layers may be adjusted continually to accommodate nutations and other variations of the rotating seal disc. The caliper assembly is mounted to the stationary retort portions by way of gimbals to allow universal movement of the caliper as it responds to sealing disc nutations. To complete the retort seal, a flexible seal boot is provided between the caliper assembly and stationary retort portion. This provides a complete retort seal where the sealing disc is sealed to the annular caliper assembly by an interface sealing layer with the caliper assembly being in turn sealed to the stationary retort portion by the flexible boot.

8 Claims, 4 Drawing Figures

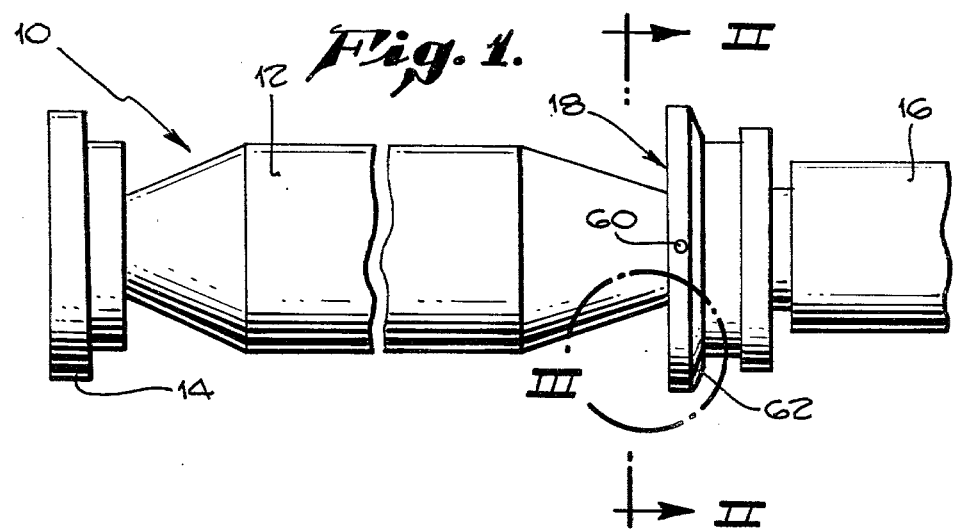
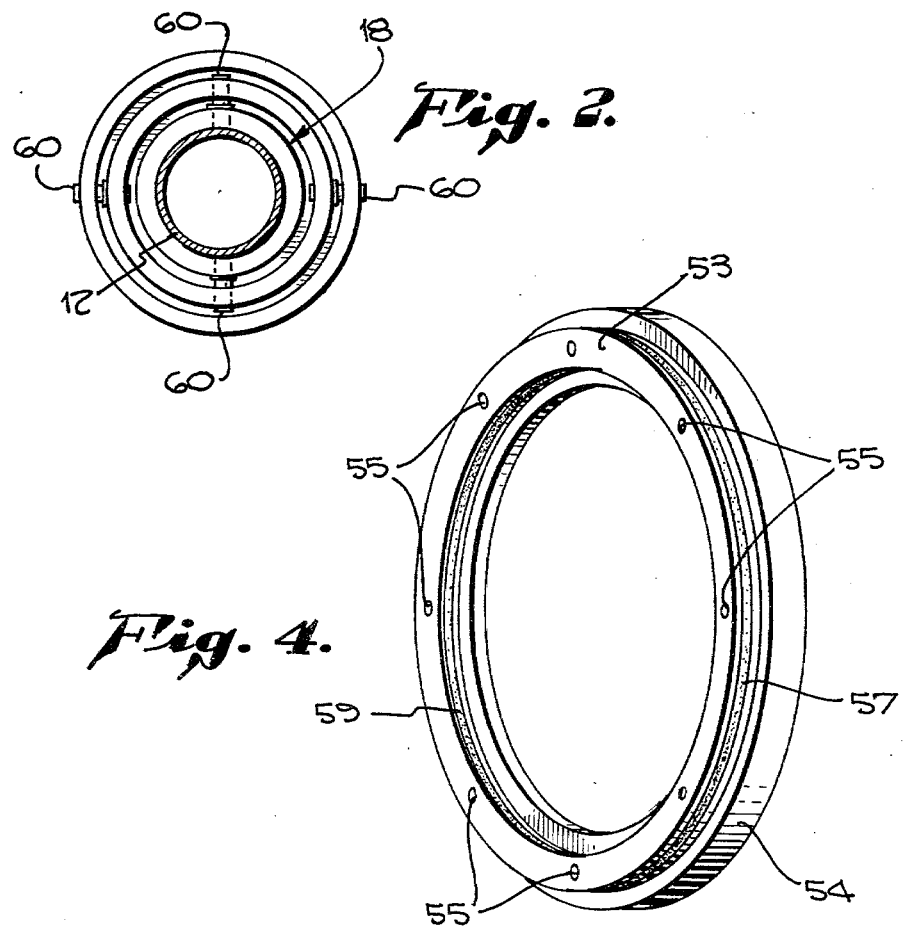

4,353,558

HYDROSTATIC RETORT SEAL

BACKGROUND OF THE INVENTION

Horizontal rotating retorts are in common use for pyrolyzing and otherwise processing carbonaceous and noncarbonaceous materials. In general, rotating retorts include a rotating vessel portion which is supported between two stationary retort portions. In the case of carbonaceous material such as oil shale, coal, peat or the like, the material is generally introduced through one stationary retort portion and into the rotating vessel portion. As carbonaceous material is rotated within the rotating vessel portion, heat is applied to the material in the absence of oxygen to pyrolyze the material and recover valuable hydrocarbon products. Due to the production of large volumes of hydrocarbon product gases, the majority of rotating retorts processing carbonaceous material are operated at pressures above atmospheric. The product vapors produced during pyrolysis are removed from the rotating vessel portion out through the other stationary retort portion and transferred to further product processing.

In operation, it is essential that suitable seals be provided between the rotating vessel portion and the stationary retort portions to prevent the escape of valuable product vapors into the atmosphere. Providing adequate seals is particularly difficult due to the large surfaces which must be sealed and high pressures which can be developed during normal retort operation. Since retorts are designed to handle large amounts of material in order to produce commercially acceptable amounts of product vapors, the retorts must necessarily be quite large. Typically, a large annular disc is attached to each end of the rotating vessel portion of the retort. These discs may be formed integrally with the rotating vessel portion or otherwise sealably attached. A suitable seal is then provided between the annular discs and each stationary retort portion. Because of their extremely large size, and due to variations and limitations in processing methods and manufacturing, the annular sealing discs which are generally available do not have perfectly uniform width or annular shape. As a result, during rotation of the rotating vessel, the seal discs tend to nutate and wobble to varying degrees. The disc nutations are generally limited within certain relatively close tolerances; however, it would be very difficult if not impossible to prevent any nutations from occurring.

Common sealing elements which have been utilized for retort seals include rubber, teflon and some more exotic materials. These type of seals are subject to wear and must be replaced continually. The replacement of these large retort seals is costly and time consuming. Further, certain areas along the seals become worn more than others due to nutations of the sealing disc. These excessively worn seal areas provide a weak point in the seal where pressurized product gases may escape from the rotating retort.

It is therefore desirable to provide a retort seal which is not dependent upon seal elements such as rubber or teflon which are subject to wear and continual replacement. It is further desirable to provide a retort seal which is self-compensating or self-aligning on the nutating sealing disc to prevent product liquid and vapor leakage during retort operations.

SUMMARY OF THE INVENTION

In accordance with the present invention, a retort seal and method is provided by hydrostatic sealing action. The present invention also provides for self-aligning or self-compensation of the seal on the rotating vessel portion sealing disc to provide a uniform hydrostatic seal to prevent product vapor leakage from the rotating retort.

The present invention is based on an annular caliper assembly which has a body portion and two integral arm portions which extend around the sealing disc of the rotating vessel portion of a rotating retort. The interior faces of the caliper arms have annular sealing channels. These channels are directly adjacent either side of the sealing disc. In accordance with the present invention, high temperature grease or other suitable liquid is passed under pressure into the sealing channels to form a pressurized hydrostatic seal between the side faces of the sealing disc or first seal surface means and the interior faces of the caliper arms or second seal surface means.

The caliper assembly is mounted on gimbals which in turn are fixed relative stationary retort portion. Due to the gimballed mounting of the caliper assembly, the caliper assembly is free to follow nutations of the sealing disc during rotation of the retort.

In another feature of the present invention, at least one of the sealing channels is mounted within an annular sealing piston which in turn is slidably mounted within the arm portion. This provides for lateral movement of the two sealing channels relative each other to thereby adjust for variations in sealing disc thickness and other irregularities. Biasing means are provided for biasing the sealing piston against the sealing disc to prevent excess amounts of grease from being lost.

As the disc nutates and additionally as the disc width varies at any given position, the pressure of the grease in the sealing channels on either side of the disc will vary. In order to encourage the caliper assembly to follow the nutations of the sealing disc and thereby prevent excess grease from squirting out through the channels when low pressure is experienced, appropriate restrictors are placed within the grease supply lines to restrict grease flow when low pressure is experienced. In a further feature of the present invention, the means for biasing the sealing piston towards the sealing disc is provided by a biasing chamber located behind the sealing piston and between the sealing piston and caliper assembly arm portion. The pressurized grease in the biasing chamber hydraulically biases the sealing piston towards the seal disc.

As will be realized, the hydrostatic seal of the present invention does not employ seal elements such as rubber which are subject to wear and require replacement. Further, by utilizing high temperature grease as the hydrostatic fluid, lubrication is achieved thereby further enhancing rotation of the sealing disc within the caliper assembly.

These and many other features and attendant advantages of the present invention will become apparent as the invention becomes better understood by reference to the following detailed description when considered in conjunction with the accompanying drawings.

BRIEF DESCRIPTION OF THE DRAWINGS

FIG. 1 is a side view of a rotating retort having a preferred retort seal in accordance with the present invention on one end thereof.

FIG. 2 is a cross-sectional view of FIG. 1 taken in the II—II plane.

FIG. 4 is a view of a preferred sealing piston in accordance with the present invention.

DETAILED DESCRIPTION OF A PREFERRED EXEMPLARY EMBODIMENT

Figure 3:
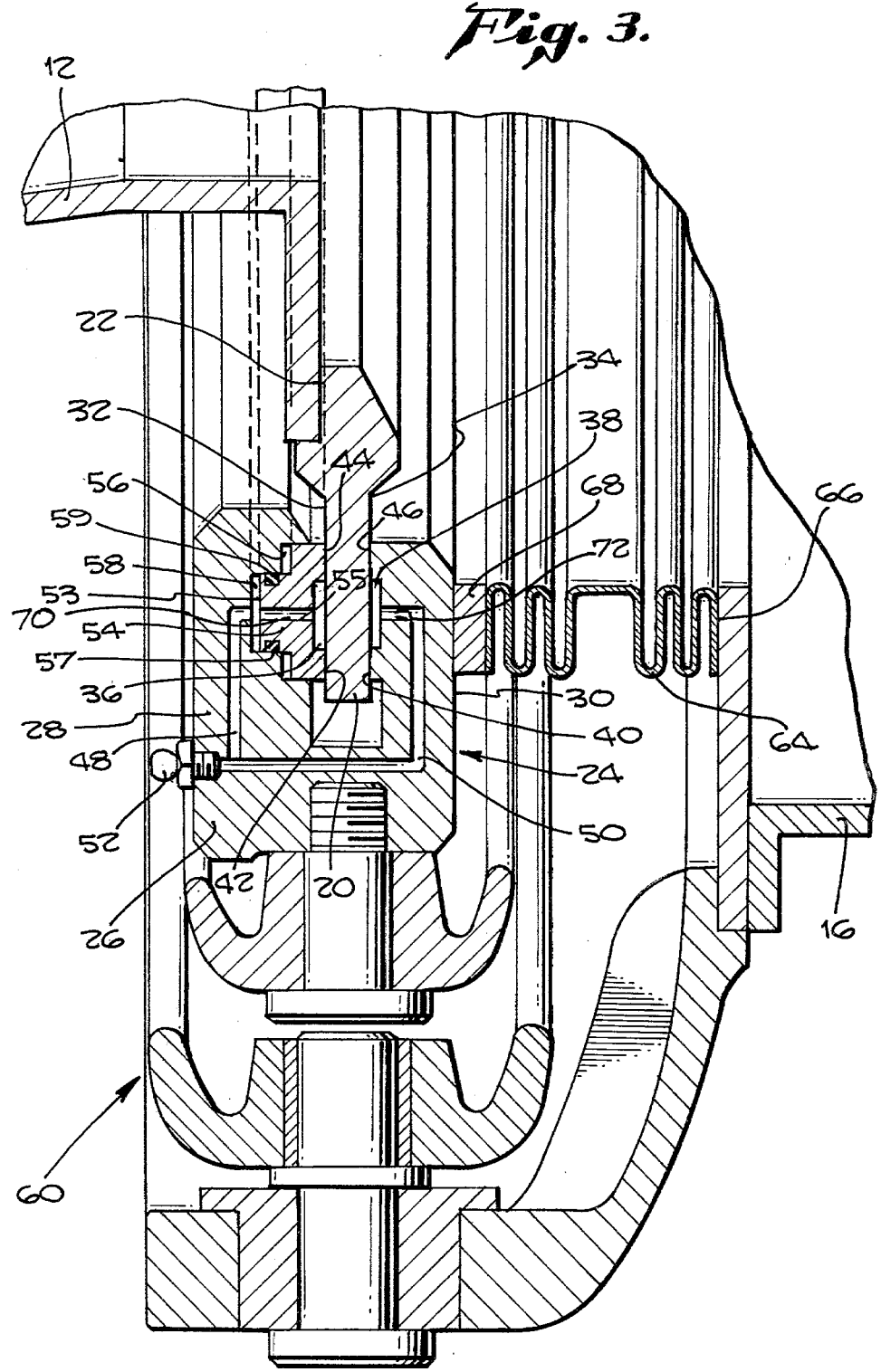
FIG. 3 is a detailed partial sectional view of the retort seal portion III as shown in FIG. 1.

Referring first to FIG. 1, a rotating retort is shown generally at 10. The rotating retort 10 includes a rotating vessel portion 12 and stationary portions 14 and 16. The retort seal of the present invention is shown at 18 and is provided for sealing the rotating vessel portion 12 to the stationary retort portion 16. As shown in FIG. 1, the exemplary retort seal 18 is shown only for sealing stationary portion 16 to the rotating vessel portion 12. The stationary portion 14 is also sealed to the rotating vessel portion 12; however, the type and character of this retort seal is not shown. Of course, the retort seal used to seal the rotating vessel portion 12 to the stationary portion 14 can be a seal of the type shown at 18 or any other suitable seal. For simplicity in describing the invention however, the retort seal 18 in accordance with the present invention is only shown at one end of the rotating vessel portion.

The rotating retort 10 shown in FIG. 1 can be any of the well-known horizontal rotating retorts. In typical operation, raw feed materials are introduced through stationary portion 14 into the rotating vessel portion 12. The rotating vessel portion 12 is maintained at an elevated temperature. As the material is continually mixed and agitated in the rotating vessel portion 12, product liquids and gases are produced. These product gases along with remaining residue are passed out of the rotating vessel portion 12 through stationary portion 16 for recovery and further processing. The retort seal 18 provides a means for sealing the rotating vessel portion 12 to the stationary portion 16. As shown in FIG. 3, the rotating vessel portion 12 is provided with first seal surface means such as the annular sealing disc 20. The annular seal disc 20 may be attached to the rotating vessel portion 12 as shown at 22 by any convenient strong sealing connection such as welding.

As particularly contemplated by the present invention, second seal surface means are provided by the caliper assembly shown generally at 24. The caliper assembly 24 is provided for sealing the stationary retort portion 16 to the sealing disc 20. The caliper assembly or annular seal jacket 24 is an annular caliper which is located concentrically with the sealing disc 20. The caliper assembly 24 includes a body portion 26 and two arm portions 28 and 30. The arm portions 28 and 30 extend radially inward to positions adjacent the side sealing surfaces 32 and 34 respectively of sealing disc 20.

To seal the caliper assembly 24 to the sealing disc 20, annular sealing channels 36 and 38 are provided in arm portions 28 and 30 respectively. A suitable sealing liquid such as high temperature grease or any other preferably viscous liquid is carried within the annular sealing channels 36 and 38 to provide a liquid interface seal layer between the sealing disc 30 and the caliper 24. High temperature grease is preferred as the liquid, since it maintains its viscosity even at the elevated temperatures of retorting. Low viscosity liquids are not preferred, since excessive amounts of liquid would escape through gaps 40, 42, 44 and 46. The high temperature grease is supplied to the annular sealing channels 36 and 38 through grease supply lines 48 and 50. Annular seals 57 and 59 are provided for sealing piston 54 within the piston channel 56 to prevent grease and pressure loss. Grease is supplied to the grease supply lines 48 and 50 through a plurality of grease fittings 52 which are spaced about the seal perimeter or, preferably is supplied to the seal assembly 18 from an external location by a high pressure pump, unshown in the drawings. Generally the pressure within a rotating retort is greater than atmospheric. Accordingly, the grease within an annular sealing channels 36 and 38 must be maintained at a pressure equal to and preferably greater than that of the existing pressure within the retort. Otherwise, the pressurized product gases and liquids will force the grease back into the grease supply lines 48 and 50 resulting in destruction of the interface liquid seal layer. On the other hand, the pressure of the grease should not be so high that excessive amounts are pushed out between gaps 40, 42, 44 and 46 resulting in excess grease loss. The thin sealing layer of grease which is provided in the annular sealing channels 36 and 38 effectively seals the caliper assembly 24 to the sealing disc 20 and at the same time provides lubrication between the caliper assembly 24 and sealing disc 20 to reduce friction.

In order to prevent excess grease loss and to provide and adequate seal, it is important that gaps 40, 42, 44 and 46 be kept as small as possible at all times. Due to variations in thickness of sealing disc 20 and due to nutations of the sealing disc 20, it is preferred that the annular sealing channels 36 and 38 be movable relative each other. In this way, adjustments can be made to accommodate nutations and other variations of the sealing disc 20 during rotation. In order to accomplish this lateral caliper adjustment, an annular sealing piston 54 is provided within arm portion 28. The sealing piston 54 is mounted within annular piston channel 56 and is movable towards and away from the sealing disc 20. In order to supply grease to the annular sealing channel 36 carried by the annular sealing piston 54, a plurality of feeder lines 55 pass through the sealing piston 54, a feature also shown in FIG. 4.

It is important that the sealing piston 54 be continually biased towards the sealing disc 20 so that gaps 40, 42, 44 and 46 are kept small to prevent grease loss. Any convenient means for biasing the sealing piston 54 inward toward sealing disc 20 may be provided. Such biasing means may include springs or the like. It is preferred however, that the sealing piston 54 be biased inwardly by pressurized grease. Pressurized grease in supply line 48 is passed into biasing chamber 58 prior to being passed to annular sealing channel 36. The biasing chamber 58 is located at the rear of the annular sealing piston 54 between the arm portion 28 and the sealing piston 54. The back surface 53 of the sealing piston 54 has a surface area which is larger than that of the surface area of sealing disc 20 which is contacted by grease under pressure in sealing channel 36. Since grease in both the biasing chamber 58 and annular sealing channel 36 are usually at the same pressure, the larger surface area present in the biasing chamber results in a net inward biasing force being exerted on annular sealing piston 54.

In order to insure that the caliper assembly 24 will be allowed to follow the nutations of ceiling disc 20, the caliper assembly 24 is mounted on gimbals shown generally at 60. The gimbals 60 allow relatively axial movement and realignment of the caliper assembly 24 during retort operation. Radial movement is accommodated by sliding and repositioning of the sealing disc 20 within the caliper assembly 24. The gimbals 60 are supported from the stationary portion 16 by a support disc 62. The gimbals 60 are spaced around the retort seal 18 as shown in FIG. 2. Since the gimbals themselves are not gas or liquid tight, it is also necessary to further seal the caliper assembly 24 to the stationary retort portion 16 to prevent loss of products. Flexible boot 64 is sealed at one end 66 to the stationary retort portion 16 while the opposite end of the flexible boot 64 is sealed to the caliper assembly 24 at 68 as shown in FIG. 3. The flexible boot is commonly made of rubber or other flexible material which may be expanded and contracted and otherwise flexed to follow the nutations of the caliper assembly caused by sealing disc nutations.

As the sealing disc 20 nutates during retort operation, momentary gaps and high or low pressure areas will be created along the annular sealing channels 36 and 38. During momentary pressure loss and gap formation, it is desirable to restrict grease flow to prevent excess amounts of grease from squirting out of the annular sealing channel 36 and 38. To prevent such grease loss, restrictors 70 and 72 are provided in arm portions 28 and 30 respectively. The restrictors are placed in grease feed lines 48 and 50 and restrict the grease flow so that when low pressures are developed along the annular sealing channels 36 and 38, only small amounts of grease will be lost before the self-compensating characteristics of the hydraulically actuated piston close the gaps and equalize pressure within the system. Since the caliper assembly 24 is freely movable about its gimbal mounting 60, the caliper assembly is free to follow the nutations of the rotating sealing disc 20 and is further free to move in either direction during caliper gap adjustments. In this way, a continually lubricated retort seal is provided which continually follows nutation of the rotating disc and also adjusts for varying thicknesses of the disc.

Having thus described an exemplary embodiment of the present invention, it should be noted by those skilled in the art that the within disclosures are exemplary only and that various other alternatives, adaptations and modifications may be made within the scope of the present invention. Accordingly, the present invention is not limited to specific embodiment as illustrated herein.

What is claimed is:

1. Hydrostatic retort seal means adapted to seal the rotating portion of a rotating retort to the stationary retort portions comprising:

first seal surface means associated with said rotating vessel portion for providing an annular sealable surface, said first seal surface means including a radially extending seal disc having first and second side surfaces with the first side surface facing towards the rotating vessel portion and the second side surface facing away from the rotating vessel portion;

second seal surface means associated with said stationary retort portion for providing an annular sealable surface located in sealable relation with said first real surface means, said second seal surface means including an annular seal jacket having first and second integral arm portions extending around said sealing disc adjacent said disc side surfaces, said first arm portion being adjacent said first side surface and said second arm portion being adjacent said second side surface;

interface seal means for sealing the first seal surface means to said second seal surface means by providing a liquid interface seal layer between the first and second seal surface means to prevent escape of gases and liquids from said rotating retort, said interface seal means including annular sealing channels in said arm portions adjacent said disc side surfaces to provide annular sealing chambers for containing said interface seal layer, said sealing channels being open adjacent said side discs whereby said interface seal layer contacts said side surfaces and seals the interface between the side surfaces and arm portions, and wherein at least one of said sealing channels is provided with an annular sealing piston which is slidably mounted within said arm portion whereby the distance between the first and second sealing channels may be varied; and gimbal means for mounting said second seal surface to provide for movement of said second seal surface to follow nutation of said first seal surface and during rotation of the rotary report.

2. Hydrostatic retort seal means according to claim 1 wherein biasing means are provided for biasing the sealing piston towards the sealing disc.

3. Hydrostatic retort seal means according to claim 2 wherein pressure means are provided for supplying liquid under pressure to said sealing channels to provide a pressurized interface seal layer.

4. Hydrostatic retort seal means according to claim 3 wherein said biasing means produces a biasing force which exerts sufficient bias on said sealing piston to maintain a small enough gap distance between the arm portions and disc side surfaces to prevent excess leakage of said liquid from said sealing channels.

5. Hydrostatic retort seal means according to claim 4 wherein said pressure means includes a common liquid reservoir and pressure lines for transferring said liquid under pressure to said sealing channels.

6. Hydrostatic retort seal means according to claim 5 wherein said pressure lines include restrictor means for preventing excess flow of liquid to said sealing channels when pressure momentarily drops in either of said channels due to momentary gap distance increases.

7. Hydrostatic retort seal means according to claim 6 wherein said liquid interface seal layer includes a lubricant.

8. Hydrostatic retort seal means according to claim 7 wherein said liquid interface seal layer is high temperature grease.

* * * * *

UNITED STATES PATENT AND TRADEMARK OFFICE
CERTIFICATE OF CORRECTION

PATENT NO. : 4,353,558
DATED : October 12, 1982
INVENTOR(S) : Donald Firth

It is certified that error appears in the above-identified patent and that said Letters Patent are hereby corrected as shown below:

In column 6, line 5, "real" should be --seal--.

In column 6, line 22, "discs" should be --surfaces--.

In column 6, line 33, "report" should be --retort--.

Signed and Sealed this

Twenty-ninth Day of March 1983

[SEAL]

Attest:

GERALD J. MOSSINGHOFF

Attesting Officer   Commissioner of Patents and Trademarks